(12) United States Patent
Huang

(10) Patent No.: US 6,283,486 B1
(45) Date of Patent: Sep. 4, 2001

(54) ENGAGING AND DISENGAGING GEAR FOR A BICYCLE PEDAL CRANK AXLE

(76) Inventor: Ming-Hui Huang, 4F-3, No. 7, Lane 159, Hsi Tun Road, Sec 3, Taichung City (TW)

( * ) Notice: Subject to any disclaimer, the term of this patent is extended or adjusted under 35 U.S.C. 154(b) by 0 days.

(21) Appl. No.: 09/482,539

(22) Filed: Jan. 14, 2000

(51) Int. Cl.[7] ....................................................... B62M 1/02
(52) U.S. Cl. ....................... 280/260; 280/261; 192/217.2; 192/17 R; 192/19
(58) Field of Search .................................... 280/259, 260, 280/261; 192/217.1, 217.2, 17 R, 17 D, 19, 64

(56) References Cited

U.S. PATENT DOCUMENTS

| | | | |
|---|---|---|---|
| 4,108,459 | * 8/1978 | Alvigini | 280/215 |
| 4,644,828 | * 2/1987 | Kozakae | 74/750 B |
| 5,027,930 | * 7/1991 | Reed | 192/6 R |
| 5,904,362 | * 5/1999 | Yoo | 280/237 |
| 5,961,424 | * 10/1999 | Warner et al. | 482/63 |

* cited by examiner

Primary Examiner—Brian L. Johnson
Assistant Examiner—Daniel Yeagley
(74) Attorney, Agent, or Firm—Michael D. Bednarek; Shaw Pittman LLP

(57) ABSTRACT

An engaging and disengaging gear for a bicycle includes an axle rotatably mounted in a five-way tube on the bicycle to connect to two pedal cranks, a thimble fixedly connected to one end of the five-way tube, an internally threaded transmission bevel gear received in the thimble, a chain wheel mounted on the axle between the thimble and a collar of the axle, and a ring spring fixed to outer surface of the transmission gear. The axle has an externally threaded section between the thimble and the chain wheel for extending through and engaging with the internally threaded transmission gear. An outer periphery of the ring spring slightly contacts with inner wall of the thimble to provide a resistance to a maximum static friction force between the transmission gear and the axle that are screwed together. When the axle is caused to turn forward, the transmission gear moves along the axle toward the chain wheel and engages with the latter, causing the chain wheel to rotate forward, too. When the axle or the chain wheel is caused to rotate reversely, the transmission gear moves along the axle toward the five-way tube and disengages from the chain wheel, so that the axle and accordingly the pedal cranks connected thereto do not keep turning reversely along with the reversing chain wheel.

5 Claims, 5 Drawing Sheets

ENGAGING AND DISENGAGING GEAR FOR A BICYCLE PEDAL CRANK AXLE

BACKGROUND OF THE INVENTION

The present invention relates to an improved bicycle pedal crank axle, and more particularly to a bicycle pedal crank axle including an engaging and disengaging gear that enables the axle and pedals connected thereto to keep unmoved while a chain wheel of the bicycle is caused to rotate reversely.

FIG. 1 schematically shows a bicycle and transmission gearing thereof. Typically, the transmission gearing of a bicycle include a pedal crank axle 11 pivotally connected to a five-way tube 1 on a frame of the bicycle, a large chain wheel 12 fixedly connected to the crank axle 11, two pedals 13 connected to free ends of two cranks extended from two ends of the crank axle 11, a small chain wheel 16 provided on a hub of a rear wheel 15 of the bicycle, and a chain 14 wound around the large and the small chain wheels 12, 16. When the two pedals 13 are alternately stepped, the crank axle 11 and the large chain wheel 12 fixed thereto are caused to rotate at the same time. The rotating large chain wheel 12 and the chain 14 together bring the small chain wheel 16 to rotate and thereby causes the rear wheel 15 to rotate forward. There are means provided between the small chain wheel 16 and the hub of the rear wheel 15 for the rear wheel 15 to keep rotating forward and the small chain wheel 16 to temporarily disengage from the rear wheel hub when the bicycle moves forward with the pedals 13 in a static state. However, when the bicycle is moved backward, the rear wheel 15 brings the small chain wheel 16 to reverse and the reversing small chain wheel 16 together with the chain 14 bring the large chain wheel 12 and accordingly the crank axle 11 to reverse at the same time. At this point, the pedals 13 are also moved reversely.

Reversing pedals 13 of a backward moved bicycle might cause little or even no trouble to general bicyclists, but they do bring considerable inconvenience to performers who play cycle tricks. The reversing pedals 13 tend to strike against or even dangerously stumble the cycle trick performers.

It is therefore tried by the inventor to develop an improved bicycle pedal crank axle to eliminate drawbacks existing in the conventional bicycle pedal crank axles.

SUMMARY OF THE INVENTION

A primary object of the present invention is to provide an engaging and disengaging gear for a pedal crank axle of a bicycle, so that when the pedal crank axle of the bicycle is caused to turn forward, it rotates a chain wheel of the bicycle, and when the pedal crank axle or the chain wheel is caused to rotate reversely, the axle disengages from the chain wheel and would not keep turning reversely along with the reversing chain wheel to possibly endanger a bicyclist walking the bicycle backward or hinder a cycle trick performer.

To achieve the above and other objects, the engaging and disengaging gear for a bicycle pedal crank axle mainly includes an axle rotatably mounted in a five-way tube on the bicycle to connect to two pedal cranks, a thimble fixedly connected to one end of the five-way tube, an internally threaded transmission bevel gear received in the thimble, a chain wheel mounted on the axle between the thimble and a collar of the axle, and a ring spring fixed to outer surface of the transmission gear. The axle has an externally threaded section between the thimble and the chain wheel for extending through and engaging with the internally threaded transmission gear. An outer periphery of the ring spring slightly contacts with inner wall of the thimble to provide a resistance to a maximum static friction force between the transmission gear and the axle that are screwed together. When the axle is caused to turn forward, the transmission gear moves along the axle toward the chain wheel and engages with the latter, causing the chain wheel to rotate forward, too. When the axle or the chain wheel is caused to rotate reversely, the transmission gear moves along the axle toward the five-way tube and disengages from the chain wheel, so that the axle and accordingly the pedal cranks connected thereto do not keep turning reversely along with the reversing chain wheel.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
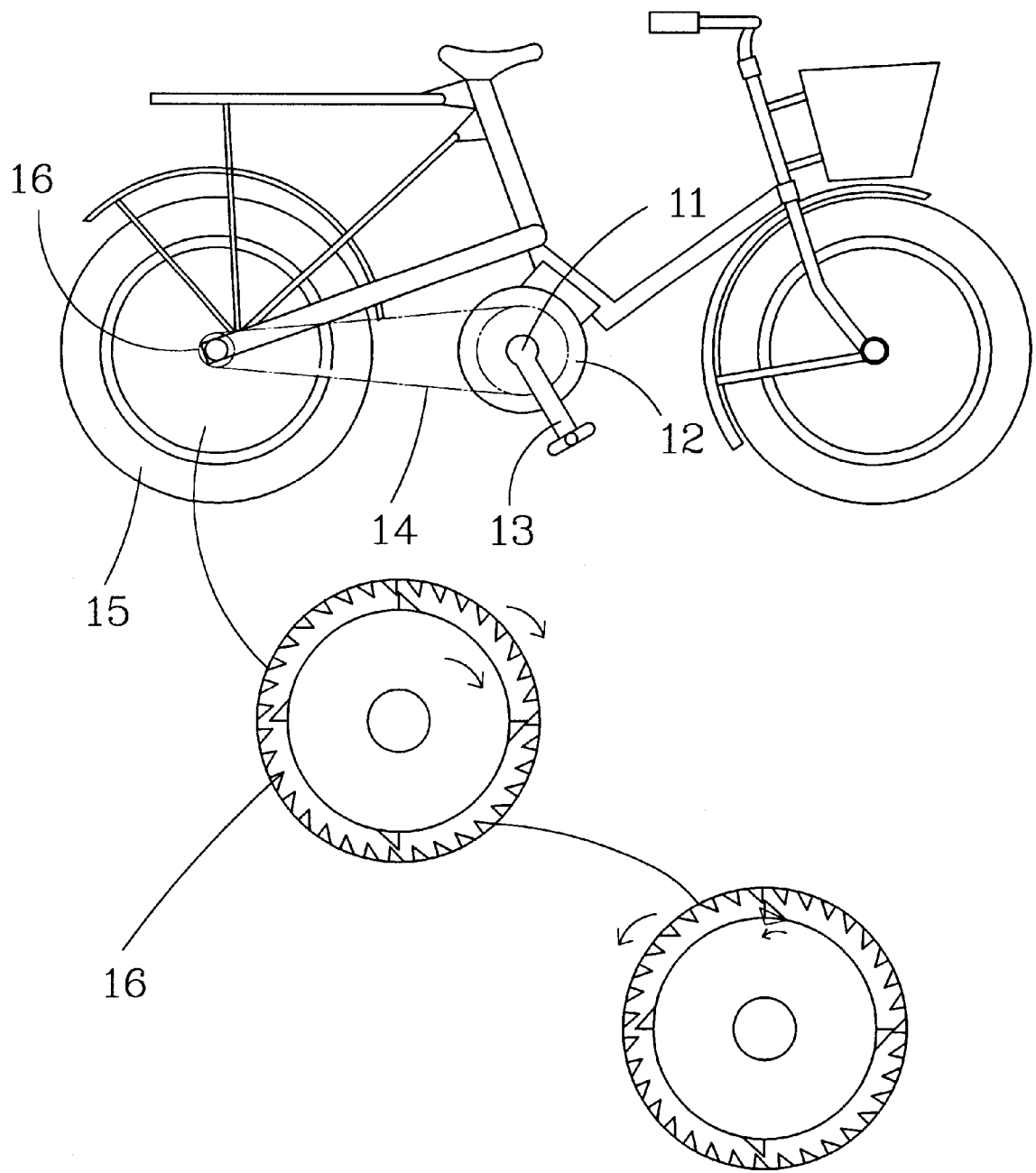
FIG. 1 is a schematical side view of a bicycle showing the transmission gearing thereof.
Figure 2:
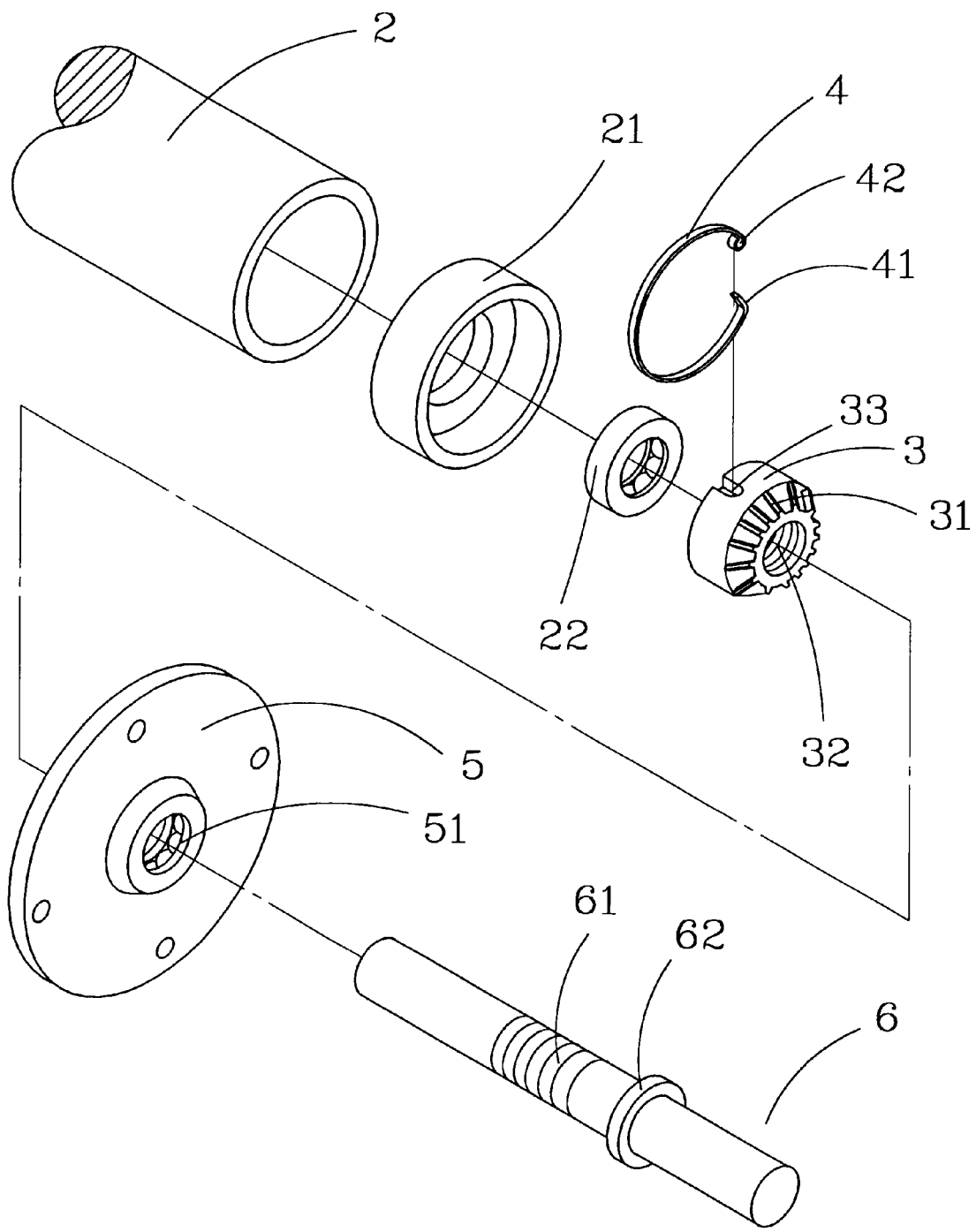
FIG. 2 is an exploded perspective of the engaging and disengaging gear for a bicycle pedal crank axle according to the present invention.
Figure 3:
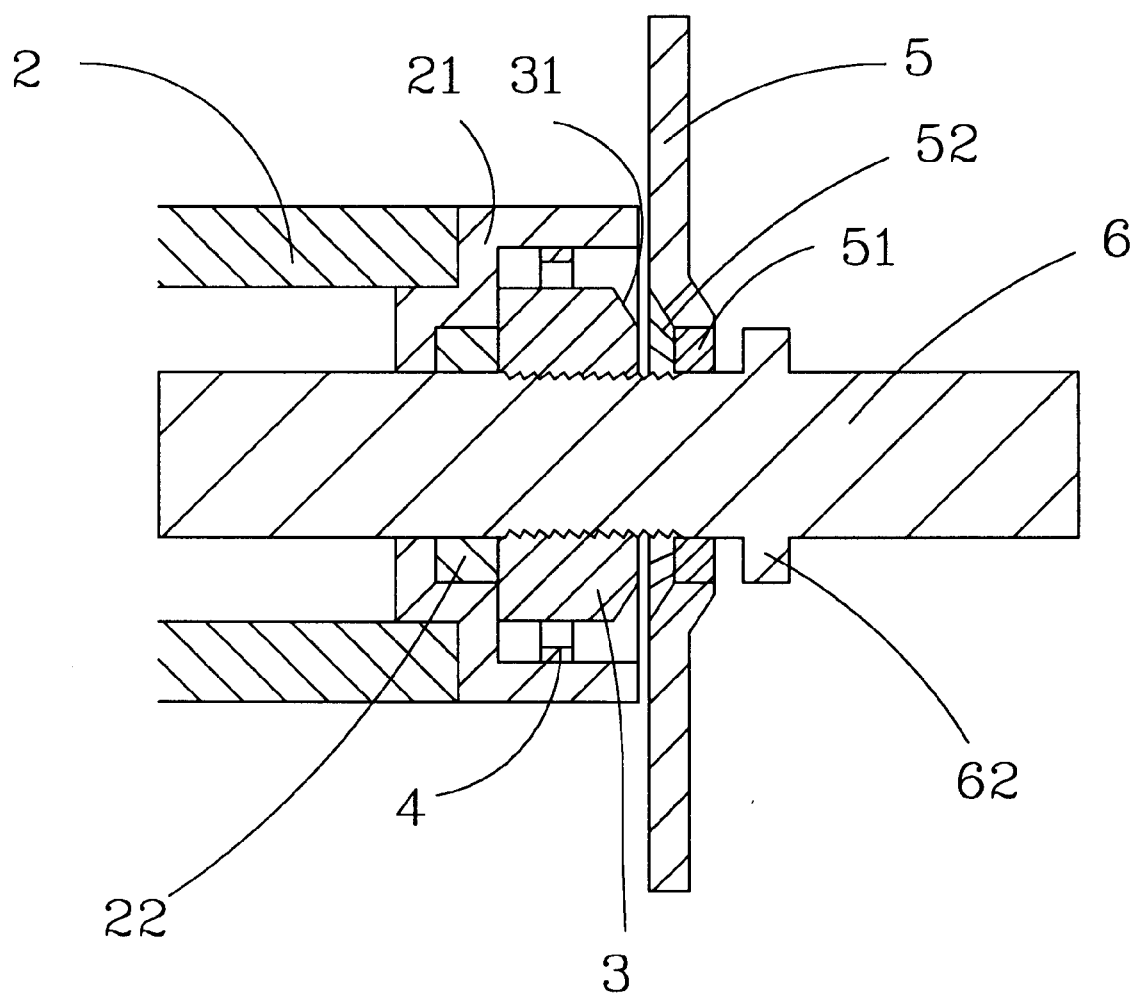
FIG. 3 is a side sectional view of the present invention in an assembled state, wherein a chain wheel and a transmission gear thereof are disengaged from each other.

Please refer to FIGS. 2 and 3 that are exploded perspective and assembled sectional views, respectively, of an engaging and disengaging gear for a bicycle pedal crank axle according to the present invention. The pedal crank axle 6 is connected at two ends to two pedal cranks (not shown). The axle 6 is turnably mounted in a five-way tube 2 provided on a bicycle frame with two ends of the axle 6 projected from the five-way tube 2 to connect to the pedal cranks. A chain wheel 5 is mounted on one end of the axle 6 to locate outside the five-way tube 2. A chain (not shown) connects the chain wheel 5 to a small chain wheel (not shown) at a rear wheel of the bicycle, so that the small chain wheel and accordingly the rear wheel are brought to rotate along with the chain wheel 5.

A stepped thimble 21 is fixedly connected to an end of the five-way tube 2 facing the chain wheel 5. As can be clearly seen from FIG. 3, a bearing 22 is mounted in a diameter-narrowed inner part of the stepped thimble 21 and the axle 6 is extended through the bearing 22, and a transmission gear 3 is mounted in a diameter-expanded outer part of the stepped thimble 21.

The transmission gear 3 is substantially a bevel gear with teeth 31 radially spaced on a bevel surface of the gear 3. The transmission gear 3 has a central hole, of which a circumferential wall is provided with an internal thread 32. And, a recess 33 and an insertion hole 34 are provided at two spaced points on an outer circumferential surface of the transmission gear 3.

A C-shaped ring spring 4 having a first free end that is bent toward an inner area of the C-shaped ring spring 4 to provide an insertion end 41 and a second free end that is curved inward to provide a round end 42. The ring spring 4 is fixed around the outer circumferential surface of the bevel gear 3 with the insertion end 41 inserted in the insertion hole 34 and the round end 42 engaged into the recess 33.

The chain wheel 5 is provided in a central hole thereof with a bearing 51. The axle 6 also extends through the bearing 51. The chain wheel 5 is so formed that an inner side thereof facing the five-way tube 2 has chisel grooves 52 corresponding to the teeth 31 on the bevel surface of the transmission gear 3, so that the chain wheel 5 may be brought by the transmission gear 3 to rotate when the chisel grooves 52 engage with the teeth 31.

The axle 6 is provided at least on a section of its outer surface between the expanded outer part of the stepped thimble 21 and the inner side of the chain wheel 5 with an external thread 61, so that the axle 6 is fixed in the five-way tube 2 with the external thread 61 engaging with the internal thread 32 of the transmission gear 3. The axle 6 is also provided on its outer surface with a collar 62, such that the collar 62 is located at an outer side the chain wheel 5.

Figure 4:
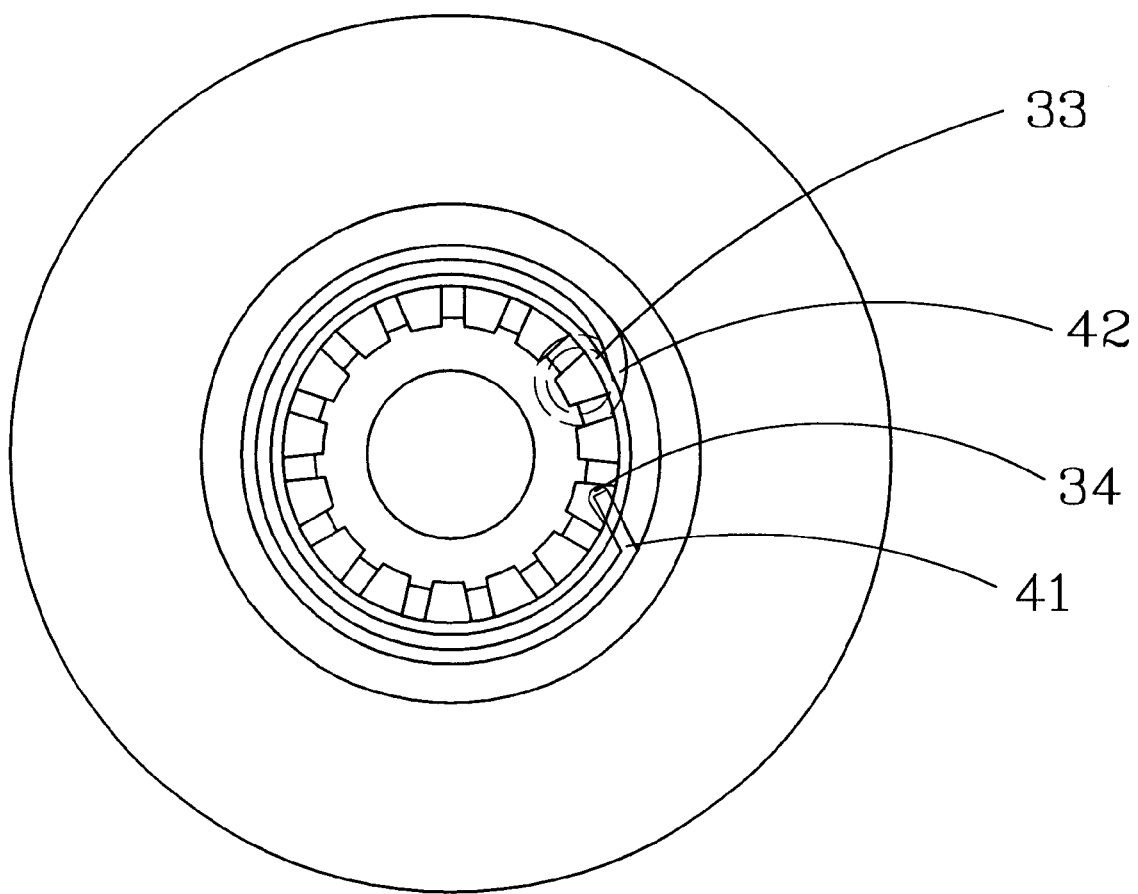
FIG. 4 is a front view of the present invention in the assembled state.

When the C-shaped ring spring 4 is fixed around the circumferential surface of the transmission gear 3, an outer periphery of the ring spring 4 slightly contacts with an inner circumferential surface of the expanded part of the stepped thimble 21, as shown in FIGS. 3 and 4. This slight contact of the C-shaped ring spring 4 with the stepped thimble 21 provides a suitable resistance to a maximum static friction force between the transmission gear 3 and the axle 6 that are engaged with each other through threads 32 and 61. Therefore, when the axle 6 rotates forward or reversely, the transmission gear 3 is initially prevented by the C-shaped ring spring 4 from rotating along with the axle 6 and is only guided by the thread 61 to move along the axle 6.

Figure 5:
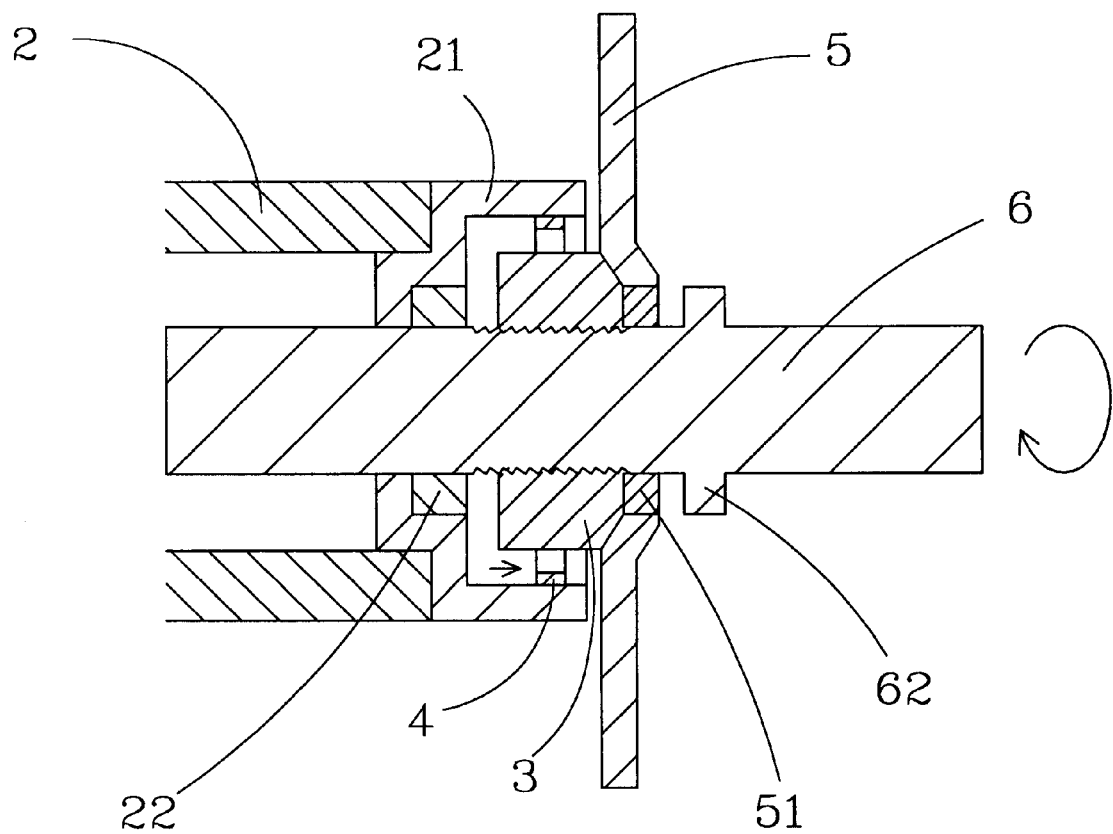
FIG. 5 is another side sectional view of the present invention in the assembled state, wherein the pedal crank axle is turned forward and the chain wheel and the transmission gear are engaged with each other.

Thus, when the axle 6 is caused to turn forward, as shown in FIG. 5, a friction force between the C-shaped ring spring 4 and the thimble 21 is higher than that between the transmission gear 3 and the axle 6, so the transmission gear 3 moves along the axle 6 toward the chain wheel 5 until the teeth 31 engage with the chisel grooves 52. At this point, the chain wheel 5 would be brought by the turning axle 6 to rotate forward, too. The forward rotation of the chain wheel 5 would, of course, in turn bring the rear wheel to rotate forward and cause the bicycle to move forward. On the other hand, when the axle 6 is caused to turn reversely, the transmission gear 3 will move along the axle 6 toward the five-way tube 2 and disengage from the chain wheel 5, as shown in FIG. 3. That is, the chain wheel 5 would not rotate reversely along with the transmission gear 3 and the axle 6. In the event the chain wheel 5 is caused by a backward moved bicycle to rotate reversely, it would bring the transmission gear 3 that engages with it to rotate reversely and move along the axle 6 toward the five-way tube 2. At this point, the transmission gear 3 immediately disengages from the chain wheel 5, leaving the chain wheel 5 to rotate alone without turning the axle 6 reversely. That is, when the bicycle is moved backward, the cranks connected to the axle 6 and the pedals connected to the cranks would not pivotally turn reversely along with the chain wheel 5. Accidents possibly injuring the bicyclist or cycle trick performers due to reversing pedals could therefore be avoided.

A main purpose of forming the insertion end 41 and the round end 42 on the C-shaped ring spring 4 is to provide different degrees of surface friction. The friction force between the round end 42 of the ring spring 4 and the thimble 21 is smaller than that between the insertion end 41 and the thimble 21. Whereby, when the chain wheel 5 rotates reversely and causes the transmission gear 3 to disengage from it, the transmission gear 3 will immediately stop moving. This allows the axle 6 to bring the transmission gear 3 to rotate forward when the axle 6 is turned forward again.

With the above arrangements, a backward moved bicycle would not have reversely rotating pedals. Therefore, general bicyclists could walk their bicycles more conveniently, and cycle trick performers would have more free space for their performance without having their legs struck or scraped by the pedals or stumbling over the pedals.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An engaging and disengaging gear for a pedal crank axle of a bicycle, said axle being rotatably mounted in a five-way tube on a frame of the bicycle with two ends thereof projected from the five-way tube to connect to two pedal cranks, one end of said axle further having a chain wheel mounted thereto between the five-way tube and the pedal crank, said chain wheel being able to bring a small chain wheel at a rear wheel of the bicycle to rotate via a chain wound around said chain wheel and said small chain wheel, said engaging and disengaging gear comprising:

a stepped thimble being fixedly connected to an end of the five-way tube facing said chain wheel and including a diameter-narrowed inner part and a diameter-expanded outer part;

a transmission gear having teeth radially spaced on a portion of its outer surface and an internal thread provided on a wall of a central hole thereof, said transmission gear being mounted in said expanded outer part of said stepped thimble with said teeth facing toward an inner side of said chain wheel;

chisel grooves being formed on the inner side of said chain wheel corresponding to said teeth on said transmission gear for detachably engaging with said teeth, and a bearing being mounted in a central hole of said chain wheel;

an external thread being provided at least on a section of said axle between said stepped thimble and said chain wheel for engaging with said internal thread of said transmission gear when said axle is sequentially extended through said bearing on said chain wheel, said internally threaded central hole of said transmission gear, and said narrowed inner part of said stepped thimble into said five-way tube; and a ring spring being put around another portion of the outer surface of the transmission gear, such that said ring spring slightly contacts its outer periphery with an inner circumferential surface of said expanded outer part of said stepped thimble to provide a suitable resistance to a maximum static friction force between said transmission gear and said axle that are screwed together;

whereby when said axle is caused to turn forward, said transmission gear is guided by said external thread to move along said axle toward said chain wheel until said teeth on said transmission gear engaging with said chisel grooves on the inner side of said chain wheel for said transmission gear to bring said chain wheel to rotate forward; and when said chain wheel or said axle is caused to rotate reversely from a forward rotating state, said transmission gear is guided by said external thread to move along said axle toward the five-way tube to disengage said teeth thereon from said chisel grooves on the inner side of said chain wheel, so that said axle and accordingly said pedal cranks connected thereto are not backward rotated by said reversing chain wheel.

2. An engaging and disengaging gear for a pedal crank axle of a bicycle as claimed in claim 1, wherein said stepped thimble is provided in said narrowed inner part with a bearing through which said axle extends into said five-way tube.

3. An engaging and disengaging gear for a pedal crank axle of a bicycle as claimed in claim 1, wherein said transmission gear is a bevel gear.

4. An engaging and disengaging gear for a pedal crank axle of a bicycle as claimed in claim 1, wherein said axle includes a collar located at an outer side of said chain wheel.

5. An engaging and disengaging gear for a pedal crank axle of a bicycle as claimed in claim 1, wherein said ring spring is a C-shaped member having an inward bent insertion end and an inward curved round end, and said transmission gear is provided on its outer surface with insertion hole and recess corresponding to said bent insertion end and said curved round end of said C-shaped ring spring for receiving them.

* * * * *